United States Patent
Kim et al.

(10) Patent No.: US 7,170,645 B2
(45) Date of Patent: Jan. 30, 2007

(54) METHOD AND APPARATUS FOR ENHANCING DIGITAL IMAGE QUALITY

(75) Inventors: Kyeong-man Kim, Gyeonggi-do (KR); Goo-soo Gahang, Gyeonggi-do (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 579 days.

(21) Appl. No.: 10/653,452

(22) Filed: Sep. 3, 2003

(65) Prior Publication Data

US 2004/0105032 A1    Jun. 3, 2004

(30) Foreign Application Priority Data

Sep. 6, 2002    (KR) ............... 10-2002-0053815

(51) Int. Cl.
  *G06K 15/00*   (2006.01)
  *G06K 9/40*    (2006.01)
(52) U.S. Cl. .............. 358/3.27; 358/1.9; 382/254; 382/260; 382/274; 347/603; 347/687; 347/607; 347/661
(58) Field of Classification Search ........... 347/603, 347/687, 607, 661; 358/1.9, 3.27; 382/254, 382/260, 274
See application file for complete search history.

(56) References Cited

U.S. PATENT DOCUMENTS

2002/0159080 A1*  10/2002  Feng et al. ........... 358/1.9
2003/0112253 A1*   6/2003  Cazier et al. ......... 345/619
2004/0105032 A1*   6/2004  Kim et al. ............ 348/607
2004/0197021 A1*  10/2004  Huang et al. .......... 382/162
2005/0088695 A1*   4/2005  Fuchigami ............ 358/2.1

FOREIGN PATENT DOCUMENTS

EP          920 193         6/1999

* cited by examiner

*Primary Examiner*—Jerome Grant, II
(74) *Attorney, Agent, or Firm*—Staas & Halsey LLP

(57) ABSTRACT

A method of and an apparatus for enhancing digital image quality. Input color data are transformed to obtain brightness data and chrominance data. The transformed brightness data is compared with predetermined brightness levels X1 and X2 on a pixel by pixel basis and the brightness data of each concerned pixel is reset or output without change according to the comparison. The comparison identifies the concerned pixel as belonging to one of a dark area and a light area requiring contrast enhancement and the brightness level of the concerned pixel is adjusted to provide the enhanced contrast. The obtained chrominance data and the reset brightness data are inversely transformed into corresponding color data. The predetermined brightness levels X1 and X2 are adaptively recomputed after a last pixel in a concerned line is considered for contrast enhancement.

28 Claims, 6 Drawing Sheets

METHOD AND APPARATUS FOR ENHANCING DIGITAL IMAGE QUALITY

CROSS REFERENCE TO RELATED APPLICATIONS

This application claims the benefit of Korean Application No. 10-2002-53815 filed Sep. 6, 2003, in the Korean Intellectual Property Office, the disclosure of which is incorporated herein by reference.

BACKGROUND OF THE INVENTION

1. Field of the Invention

The present invention relates to image processing which enhances a quality of an image in a document scanned and input by an image input device, and more particularly, to a method of digital image quality enhancing and an apparatus for enhancing a quality of a digital image on a background region of a document such as a newspaper article, in which degradation of the image quality occurs.

2. Description of the Related Art

Examples of conventional image quality enhancing techniques include histogram equalization, contrast stretching, and a method of enhancing image quality shown in FIG. 1. FIG. 1 is a flowchart showing a conventional image processing method disclosed in Korean Patent Publication No. 1999-43374. A histogram equalization process includes: calculating an occurrence frequencies of gray levels from an input image; computing a histogram value or probability density function (PDF) using the occurrence frequencies of gray levels; integrating the PDF to develop a cumulative distribution function (CDF); and mapping the input image to make the distribution of brightness values uniform using the CDF. This histogram equalization approach has a major disadvantage such that objects in a high quality image with a uniform distribution of brightness values lose their correct relative brightness values.

A contrast stretching technique involves: calculating occurrence frequencies of gray levels of an input image; computing a histogram value or PDF using the occurrence frequencies of gray levels; computing maximum and minimum brightness values of the image histogram; and expanding the gray level distribution based on a difference between the minimum and maximum brightness values. The contrast stretching technique has a problem in that undesired results arise in a case where an input image has special characteristics or contains noise.

When reading a document image using an image input device comprised of a memory for white shading correction, a memory for black shading correction, and a preprocessor with a maximum value detector, the conventional image quality enhancement method illustrated in FIG. 1 includes: generating reference data for correcting distortion of the document image (S201); setting maximum and minimum reference voltages in order to adjust contrast and brightness of the document image and eliminate the background color (S202); compensating for image distortion by simultaneously performing black shading correction and white shading correction on the document image using the reference data and performing image processing on the document image using the set maximum and minimum reference voltages (S203); and outputting the document image subjected to image distortion correction and image processing as digital image data (S204). In an image input device such as a scanner, black shading correction is performed to compensate for a difference between pixels due to different characteristics of image sensors such as a charge coupled device (CCD) or a contact image sensor (CIS). Along with black shading correction, white shading correction is performed to correct distortion caused by non-uniformity of a light source, local variations in reflectivity of a mirror and a transmissivity of a lens in a scanner optical system, contamination on a light path, etc. According to this conventional method, contrast is corrected based only on data obtained by white shading correction and black shading correction. However, varying background intensity of the document image is not reflected using only the above shading corrections, thus the conventional method is not adaptive to a document. Another problem is that longer processing time is required for image quality enhancement since prescan is necessary in order to obtain a maximum brightness value for brightness correction.

SUMMARY OF THE INVENTION

The present invention provides a method of enhancing digital image quality that enables automatic contrast enhancement by being adaptively performed according to a document image having various characteristics input to an image processing apparatus including an image input device.

The present invention also provides an apparatus for performing digital image quality enhancing by adaptively performing automatic contrast enhancement.

According to an aspect of the present invention, there is provided a method of enhancing digital image quality wherein original brightness data $X_{ij}$ of a concerned pixel and predetermined brightness levels $X1$ and $X2$ which are reference variables are compared to obtain new brightness data $Y_{ij}$ with enhanced contrast. The method comprises: setting initial values of a parameter $V_b$ for calculating the brightness level $X1$, a parameter $V_p$ for calculating the brightness level $X2$, the initial brightness level $X1$, and the initial brightness level $X2$; transforming RGB color data for the concerned pixel into the brightness data $X_{ij}$ and chrominance data; comparing the brightness data $X_{ij}$ with the parameters $V_b$ and $V_p$; resetting the parameters $V_b$ and $V_p$ according to the comparison results; identifying a background area requiring contrast enhancement according to the results of comparison between the brightness data $X_{ij}$ and either the parameter $X1$ or the parameter $X2$; contrast enhancing pixels belonging to the background area to obtain enhanced contrast brightness data $Y_{ij}$; inversely transforming the enhanced contrast brightness data $Y_{ij}$ and the transformed chrominance data into enhanced RGB color data; determining whether the concerned pixel is a last pixel in a concerned line; repeating the transforming, the comparing, the resetting, the identifying, the contrast enhancing and the inverse transforming for a next pixel in the concerned line, if it is determined that the concerned pixel is not the last pixel in the concerned line; updating the brightness levels $X1$ and $X2$ using the parameters $V_b$ and $V_p$, respectively, and determining whether the concerned pixel is a last pixel to be subjected to the image quality enhancement processing, if it is determined that the concerned pixel is the last pixel in the concerned line; repeating the transforming, the comparing, the resetting, the identifying, the contrast enhancing and the inverse transforming for a next pixel in a next line, if it is determined that the concerned pixel is not the last pixel to be subjected to the image quality enhancement processing.

The method may further comprise compensating for the parameters $V_b$ and $V_p$ prior to the repeating of the transforming, the comparing, the resetting, the identifying, the contrast enhancing and the inverse transforming of the next pixel in the next line.

According to another aspect of the present invention, there is provided a digital image quality enhancing apparatus for performing image enhancement processing on image data comprised of pixels having predetermined resolutions obtained by scanning a document. The apparatus comprises a color data conversion unit which converts incoming RGB data for a concerned pixel into brightness data Xij and chrominance data, a division unit which divides the image data into a background area requiring contrast enhancement and another area not requiring the contrast enhancement using the brightness data Xij, an enhancement unit which performs the contrast enhancement on the concerned pixel belonging to the background area, and a color data inverse conversion unit which inversely a Yij signal output from the enhancement unit after contrast enhancement and the chrominance data output from the color data conversion unit into enhanced RGB data, wherein the division unit comprises a mediator signal detecting portion which detects a minimum value of the brightness data Xij from a corresponding concerned line and outputs a mediator signal Vb while detecting a maximum value of the brightness data Xij from the corresponding concerned line and outputs a mediator signal Vp, a reference signal generating portion which outputs a signal X1 derived by applying a first predetermined weighting factor (α) and a first predetermined offset (α) to the mediator signal Vb in response to the mediator signal Vb while outputting a signal X2 derived by applying a second predetermined weighting factor (β) and a predetermined offset (b) to the mediator signal Vp in response to the mediator signal Vp, and an area segmenting portion which compares the brightness data Xij with the signals X1 and X2 and outputs a first area signal if Xij is less than or equal to X1, a second area signal if Xij is greater than X1 but less than X2, and a third area signal if Xij is greater than or equal to X 2.

BRIEF DESCRIPTION OF THE DRAWINGS

The above and/or other aspects and advantages of the present invention will become apparent and more readily appreciated from the following description of the preferred embodiments, taken in conjunction with the accompanying drawings of which.

DESCRIPTION OF THE PREFERRED EMBODIMENTS

Figure 1:
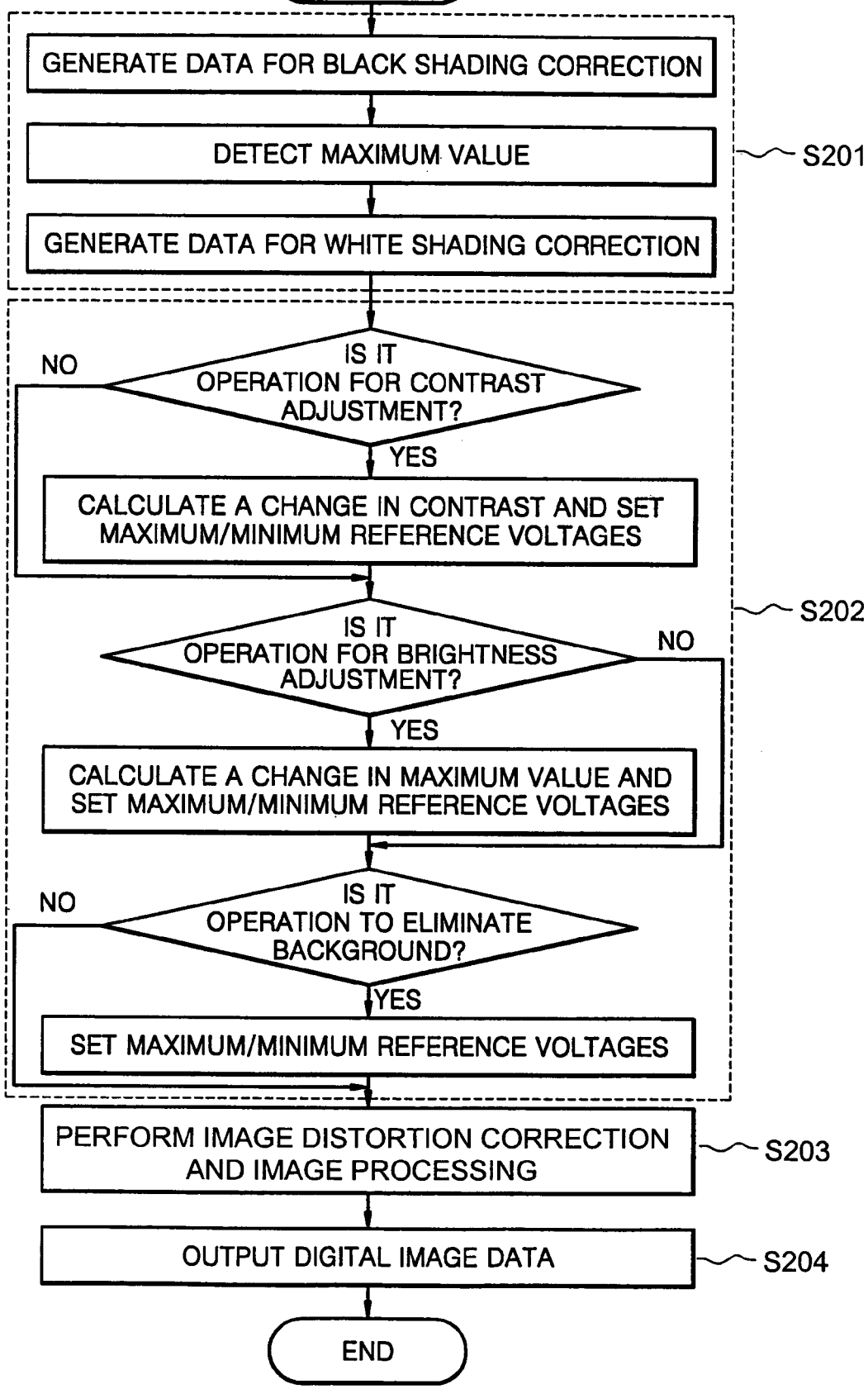
FIG. 1 is a flowchart illustrating a conventional image processing method to enhance digital image quality.

A method of enhancing digital image quality and a configuration and operation of an apparatus for enhancing digital image quality according to the present invention will now be described with reference to the accompanying drawings. An initial appreciation of the following symbols and terms used in the description which follows will contribute to a better understanding of the invention:

Xij Brightness data or brightness signal of a concerned pixel, or a value corresponding to a luminance component Y defined by Equations (1) and (2);

Yij Brightness data or brightness signal obtained by performing contrast enhancement on Xij, or a value corresponding to a luminance component Y defined by Equation (3);

| i | Number of a row corresponding to a concerned line; |
|---|---|
| j | Column number of a concerned pixel; |
| X1 | Reference variable or signal for identifying a dark background area; |
| Vb | Parameter or reference signal for calculating X1; |
| α | Weighting factor used in calculating X1; |
| a | Offset used in calculating X1; |
| X2 | Reference variable or signal for identifying a light background area; |
| Vp | Parameter or mediator signal for calculating X2; |
| β | Weighting factor used in calculating X2; |
| b | Offset used in calculating X2; |
| $\Delta_1$ | Constant used in resetting Vb and Vp; |
| $\Delta_2$ | Constant used in compensating for Vb and Vp; |
| t1 | Contrast enhancing coefficient for a dark background area; and |
| t2 | Contrast enhancing coefficient for a light background area. |

The method of enhancing digital image quality according to the present invention is used to process image data composed of pixels having a predetermined resolution obtained by scanning with an image input device such as a scanner.

A typical scanner has a light source which reflects a light beam, a lens which converges the reflected light beam, and an image sensor which receives the converged light beam. The image sensor may be implemented with a charge coupled device (CCD) or contact image sensor (CIS) comprised of an array of electrical cells positioned at regular intervals. The image sensor receives a light beam reflected from a document and discretizes the beam into digital image data having a predetermined resolution. Here, data from each cell of the image sensor, which is the smallest unit of discretized data, is called a pixel.

A 'concerned pixel' means a pixel being subjected to or processed by a digital image quality enhancing method according to the present invention. In this invention, image processing for quality enhancement is sequentially performed on each concerned pixel and its adjacent pixels. That is, after image quality enhancement processing is performed on a concerned pixel, image quality enhancement processing is sequentially performed in the same way with an adjacent pixel being the concerned pixel. A 'concerned line' refers to a row to which each concerned pixel belongs. For example, original brightness data of each concerned pixel is denoted by 'Xij' where i and j are a number of a row corresponding to a concerned line and a column number, respectively.

According to the present invention, if the original brightness data Xij of each concerned pixel belongs to a dark background area having a brightness value less than or equal to X1, contrast enhancement is performed on the brightness data Xij to make the pixel darker. If the original brightness data Xij of the concerned pixel belongs to a light background area with a brightness value greater than or equal to X2, contrast enhancement is performed on the brightness data Xij to make the pixel lighter and obtain new brightness data Yij. The method of this invention is not intended to make an area perceived as background completely white in the image scanned from a document such as a newspaper article. Rather, the present method is intended to enhance digital image quality by making an area perceived as a background printed lighter than a text or photograph area.

Figure 2:
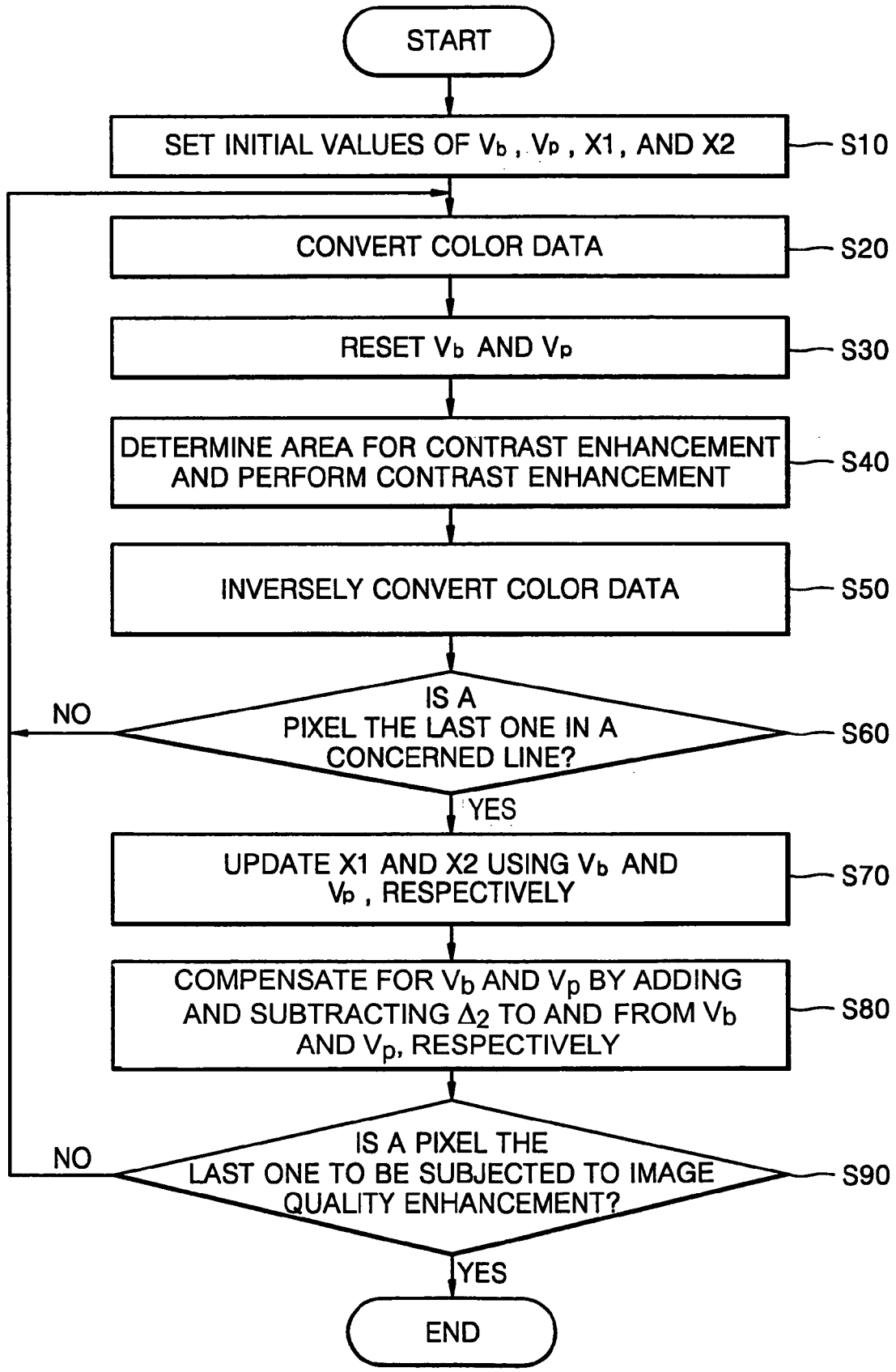
FIG. 2 is a flowchart illustrating a method of enhancing digital image quality according to an embodiment of the present invention.

FIG. 2 is a flowchart illustrating a method of enhancing digital image quality according to an embodiment of the present invention. The method illustrated in FIG. 2 comprises: setting initial values of Vb, Vp, X1, and X2 (operation S10); converting color data (operation S20); resetting the variables Vb and Vp (operation S30); performing contrast enhancement (operation S40); inversely transforming color data (operation S50); updating the variables X1 and X2 (operation 70); determining a position of a concerned pixel (operations S60 and S90); and compensating for Vb and Vp (operation S80). Here, operation S80 may be optionally performed. The operation S40 of performing contrast enhancement on a concerned line is executed according to a result obtained by processing a previous line. That is, operations S30 and S70 are performed on each concerned line in order to appropriately perform contrast enhancement on a next concerned line (operation S40).

In operation S10, which is the operation of initializing variables, the initial values of variables Vb, Vp, X1, and X2 are set. The initial values of Vb and Vp are brightness thresholds. Thus, an area with a brightness value below Vb or above Vp is processed for image quality enhancement by the method according to the present invention. Variable X1 denotes a reference variable for identifying a dark background area. If brightness data Xij of a concerned pixel positioned in a corresponding concerned line is less than X1, the concerned pixel belongs to a dark background area to be subjected to contrast enhancement processing. Variable X2 denotes a reference variable for identifying a light background area. If brightness data Xij of the concerned pixel is greater than X2, the concerned pixel belongs to a light background area to be subjected to contrast enhancement processing. Variables Vb and Vp are parameters used in calculating X1 and X2, respectively. Variables X1 and X2 are obtained by applying predetermined weighting factors and offsets to Vb and Vp, respectively.

As an embodiment of operation S10, in case of an image scanned using a 256-step gray scale, initial values of Vb and Vp may be set to 50 and 180, respectively. The initial values of X1 and X2 may be set by applying predetermined weighting factors and offsets to the initial values of Vb and Vp, respectively. In operation S20, RGB color data of the concerned pixel is converted into color data having brightness and chrominance components. A color model is represented by a three-dimensional coordinate system and mostly used for color monitors, animation graphics or TV screens. Examples of color models may include a RGB (Red, Green, Blue) model for color monitors and color video cameras, a YIQ model which is the standard for color TV broadcasts, and a YCbCr model used to build the digital video standard.

An RGB color model originates from the way in which a display light-emitting element and an image sensor of a camera or a scanner operates. In order to process a 256-step gray scale color image, an RGB model uses 8 bits for each R, G, B color. Therefore, each pixel requires 3 bytes of storage for 24-bit color.

The YIQ color model is a system adopted for maintaining compatibility with equipment used for color TV broadcasting. In the YIQ model designed to separate RGB color data into luminance (brightness) and chrominance (color), Y component representing luminance provides all video information required by black-and-white television sets while I and Q are two chrominance components called inphase and quadrature, respectively. Conversion from a RGB color model to a YIQ color model is defined by Equation set (1):

$$Y=0.29900R+0.58700G+0.11400B$$

$$I=0.59600R-0.27500G-0.32100B$$

$$Q=0.21200R-0.52300G+0.31100B \tag{1}$$

where luminance component Y corresponds to variable Xij used to describe the present invention.

The YCbCr color model is defined by Recommendation ITU-R BT.601 for world-wide digital video component standards. The YCbCr color model is also designed to separate RGB color data into luminance and chrominance where Y represents luminance and Cb and Cr represent blue chrominance and red chrominance, respectively. There are many ways of converting a RGB color model to a YCbCr model. A typical color data conversion and inverse conversion defined by ITU-R (International Telecommunication Union-Radio Communication Sector) and used in image compression schemes such as JPEG and MPEG are performed using the following Equation sets (2) and (3), respectively:

$$Y=0.29900R+0.58700G+0.11400B$$

$$Cb=-0.16874R-0.33126G+0.50000B$$

$$Cr=0.50000R-0.41869G-0.0813B \tag{2}$$

$$R=1.00000Y+1.40200Cr$$

$$G=1.00000Y-0.34414Cb-0.71414Cr$$

$$B=1.00000Y+1.77200Cb \tag{3}$$

The luminance component Y in the Equation set (2) corresponds to original brightness data Xij of a concerned pixel used in this invention. The inverse conversion indicated by Equation set (3) above is optionally performed in operation S50 for color output. The luminance component Y in Equation set (3) corresponds to brightness data produced after contrast enhancement for the original brightness data Xij.

In operation S30, values of Vb and Vp are reset. Brightness data Xij of the concerned pixel is compared with Vb, and Vb is reset according to a result of the comparison. Similarly, the brightness data Xij is compared with Vp, and Vp is reset according to a result of the comparison. Operation S30 is also provided to obtain a maximum brightness value for a light background area from a concerned line.

Figure 3:
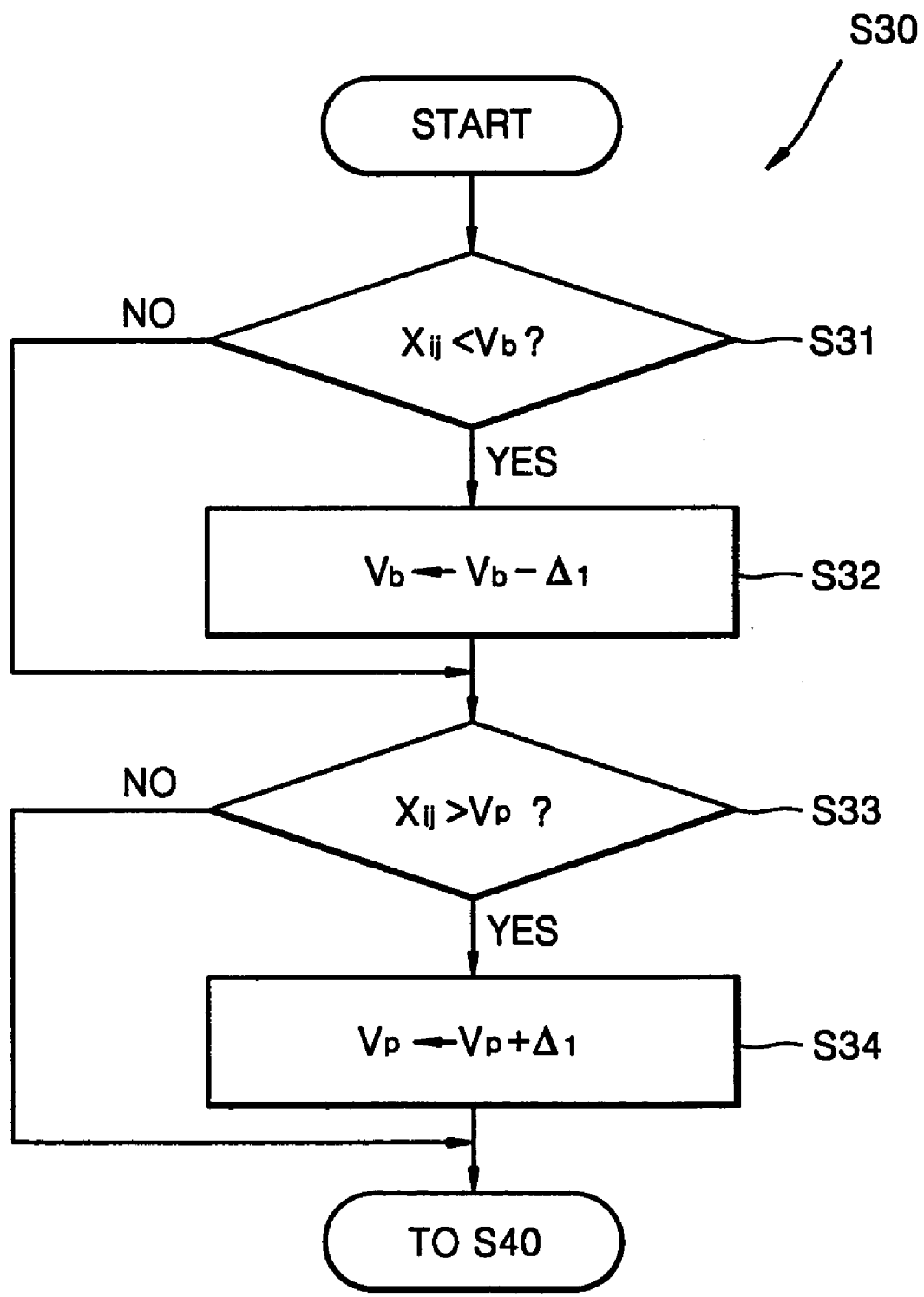
FIG. 3 is a flowchart illustrating a method of resetting Vb and Vp in the method shown in FIG. 2.

FIG. 3 is a flowchart illustrating operation S30 shown in FIG. 2. In FIG. 3, operation S30 is subdivided into operations S31–S34. In operation S31, it is determined whether the brightness data Xij of the concerned pixel is less than Vb. In operation S32, if it is determined that the brightness data Xij of the concerned pixel is less than Vb, a predetermined constant $\Delta_1$ is subtracted from Vb in order to reset Vb. In operation S33, it is determined whether the brightness data Xij of the concerned pixel is greater than Vp. In operation S34, if it is determined that the brightness data Xij of the concerned pixel is greater than Vp, the predetermined constant $\Delta_1$ is added to Vp in order to reset Vp.

In the operations S32 and S34 described above, a predetermined small value is subtracted from Vb or added to Vp so that text or picture area in input gray-scale image data, the brightness of which sharply changes, may not be misconceived as the background area. Therefore, $\Delta_1$ may be set to 1 in a 256-step gray scale, for example.

Figure 4:
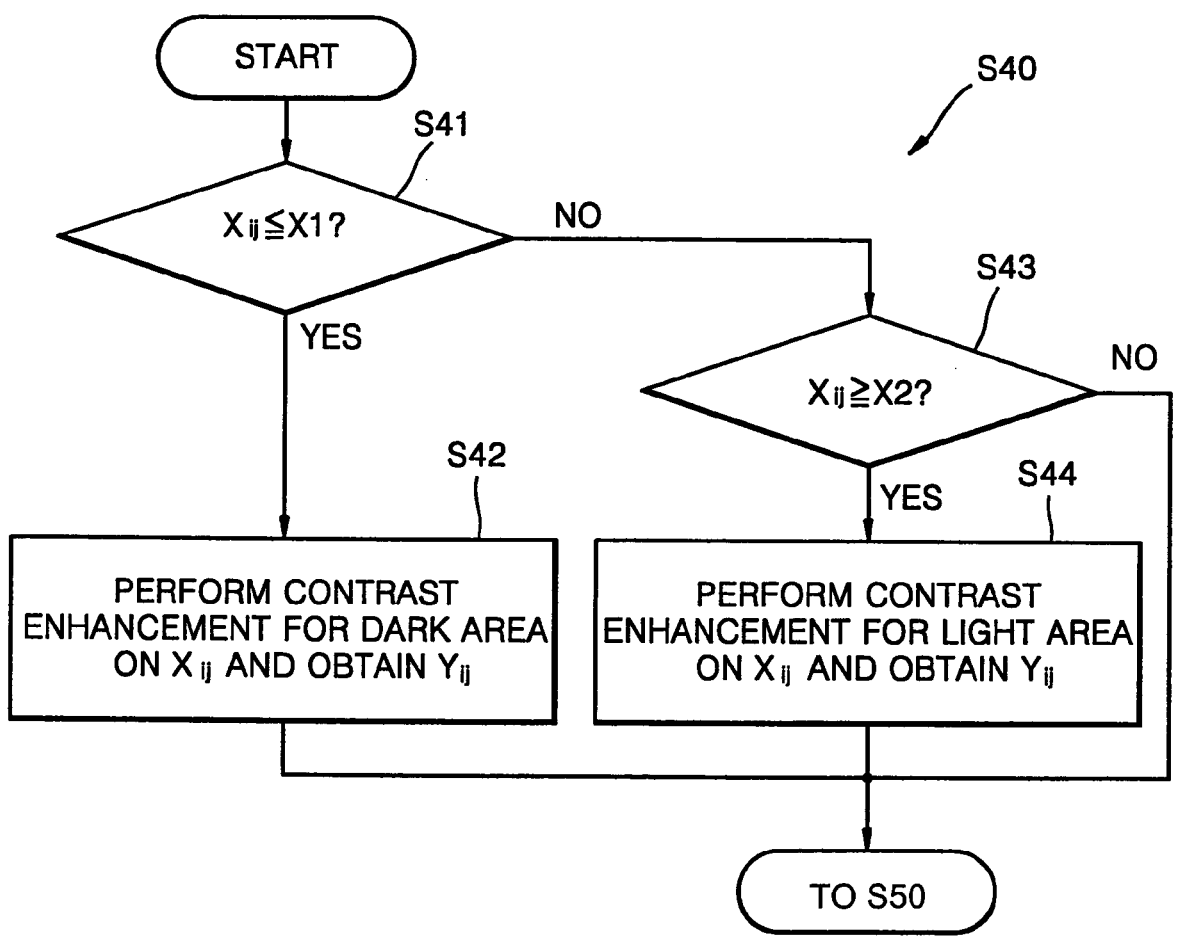
FIG. 4 is a flowchart illustrating a method of determining an area for contrast enhancement and performing contrast enhancement in the method shown in FIG. 2.

In operation S40, a background area to be subjected to contrast enhancement processing is determined and contrast enhancement is performed on the background area. FIG. 4 is a flowchart illustrating operation S40 shown in FIG. 2. Referring to FIG. 4, in operations S41 through S44, the brightness data Xij of the concerned pixel is compared with either X1 or X2 and contrast enhancement is performed on a dark or light background area depending on the result of the comparison.

In operation S41, it is determined whether the brightness data Xij of the concerned pixel is less than or equal to X1. If it is determined Xij is less than or equal to X1, contrast enhancement for the dark background area is performed on Xij to obtain brightness data Yij with enhanced contrast (operation S42).

An embodiment of operation S42 is represented by Equation (4):

$$Yij = t1 \cdot Xij, \quad 0 \leq Xij \leq X1 \qquad (4)$$

where t1 is a contrast enhancing coefficient for a dark background area and equals Y1/X1. Y1 denotes predetermined brightness data with a value less than X1 and is applied to contrast enhancement for the dark background area.

If it is determined that Xij is greater than X1 in operation S41, then operation S43 is performed to determine whether Xij is greater than or equal to X2. If it is determined that Xij is greater than or equal to X2, contrast enhancement for the light background area is performed on Xij to obtain brightness data Yij with enhanced contrast (operation S44).

An embodiment of operation S44 where 256-step gray scale is used is represented by Equation (5):

$$Yij = t2 \cdot (Xij - X2) + Y2, \quad X2 \leq Xij \leq 255 \qquad (5)$$

where t2 is a contrast enhancing coefficient for a dark background area and equals (255−Y2)/(255−X2). Y2 denotes predetermined brightness data with a value greater than X2 and is applied for enhancement in contrast of the dark background area.

Figure 5:
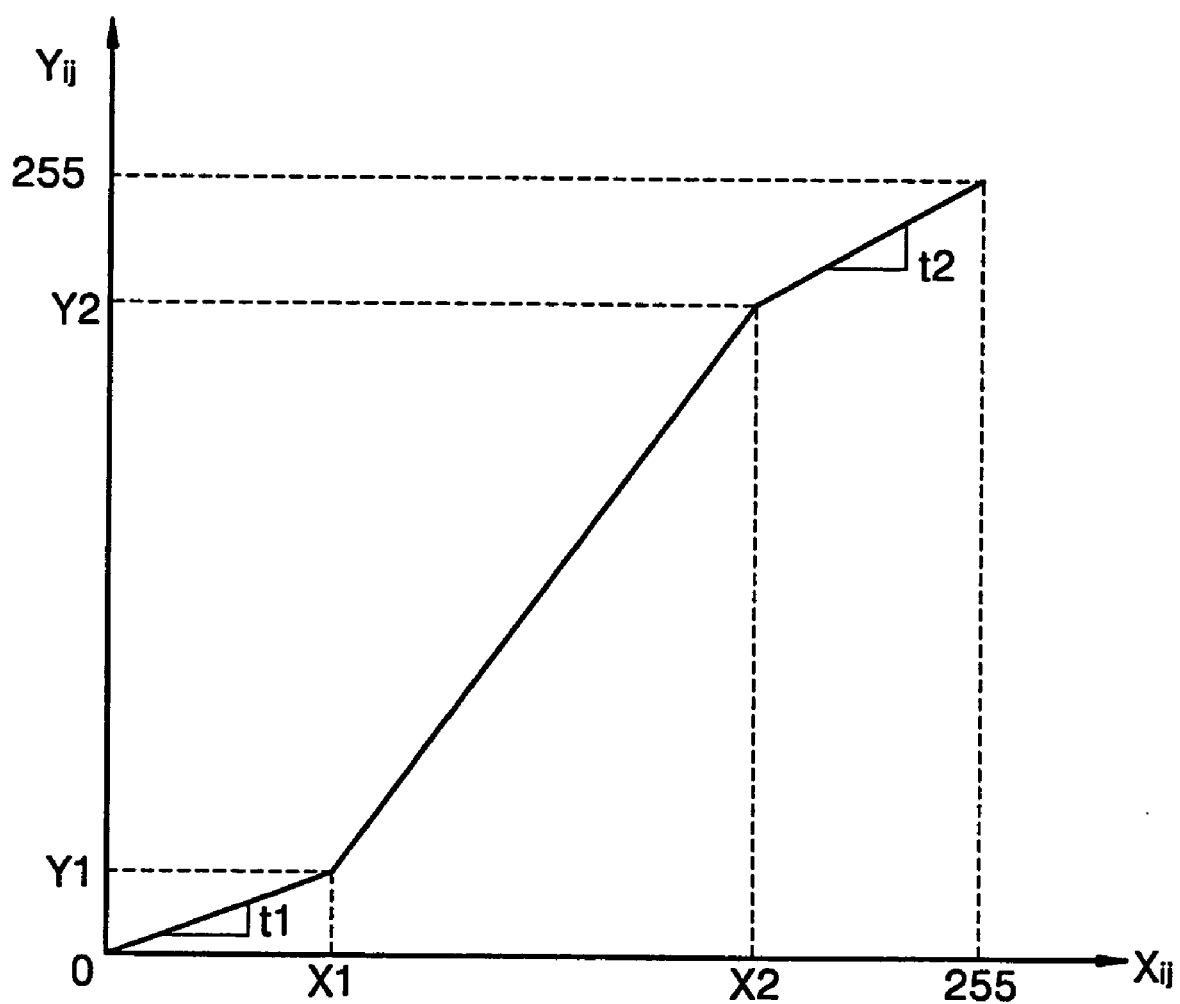
FIG. 5 is a graph showing a transform function of contrast enhancement performed by the method shown in FIG. 4.

FIG. 5 is a graph illustrating a transform function of contrast enhancement performed by operation S40. As shown in FIG. 5, Y1 and Y2 are determined using X1 and X2, respectively, obtained by Equation (6) described below, and contrast enhancement is performed on the original brightness data Xij of the concerned pixel to obtain Yij using the Equations (4) and (5).

In operation S50, color data is inversely transformed into an appropriate color model. For example, where RGB color data is transformed into the YCbCr color model indicated by Equation (2) above, in operation S50, color data inverse transform is performed using Equation (3). Here, the luminance component Y in Equation (3) corresponds to brightness data subjected to contrast enhancement in operation S40.

In operation S60, it is determined whether the concerned pixel is the last pixel in the concerned line. If it is determined that it is not the last pixel, the method returns to operation S20 in order to proceed with a next concerned pixel. Since X1 and X2 are updated every line, operation S60 serves as a pre-operation to operation S70 for updating X1 and X2.

In operation S70, if it is determined that the concerned pixel is the last pixel in the concerned line, X1 and X2 are updated using Vb and Vp, respectively.

In an embodiment of operation S70, X1 is updated with a value derived by multiplying a predetermined weighting factor α by Vb and then adding a predetermined offset a to the product αVb. X2 is updated with a value derived by multiplying a predetermined weighting factor β by Vp and then adding a predetermined offset b to the product βVp. That is, X1 and X2 are updated using Equation set (6).

$$X1 = \alpha Vb + a$$

$$X2 = \beta Vp + b \qquad (6)$$

The predetermined weighting factors α and β may be determined to be in respective ranges greater than 0 and less than or equal to 1, i.e. $0 < \alpha \leq 1$ and $0 < \beta \leq 1$. Also, the offsets a and b may be determined to be in respective ranges greater than or equal to −128 and less than or equal to 127, i.e., $-128 \leq a \leq 127$ and $-128 \leq b \leq 127$.

As can be seen in Equation set (6), if α=1 and a=0, X1 equals Vb, and if β=1 and b=0, X2 equals Vp. By varying values X1 and X2 depending on Vb and Vp according to equation set 6, brightness of a background in an output image is adjustable according to the needs of users and manufacturers.

Operation S80 may be optionally provided to prevent momentary saturation of Vb and Vp. After operation 70, Vb and Vp are updated by compensating for Vb and Vp in operation S80 and the process then proceeds to operation S90. Operation S80 comprises compensating for Vb and Vp by subtracting and adding a predetermined value, and compensating for Vb and Vp by comparing Vb and Vp with their initial values. A predetermined constant $\Delta_2$ is added to Vb and subtracted from Vp in order to update Vb and Vp. If a value produced by compensating for Vb by addition is greater than the initial value of Vb set in operation S10, compensation has no effect and Vb is updated with the initial value of Vb set in operation S10. In the meantime, if a value produced by compensating for Vp by subtraction is less than the initial value of Vp set in operation S10, compensation has no effect and Vp is updated with the initial value of Vp set in operation S10. That is, Vb and Vp updated according to Equation set (7):

$$Vb = \min\{\text{initial value of } Vb, (Vb + \Delta_2)\}$$

$$Vp = \max\{\text{initial value of } Vp, (Vp - \Delta_2)\} \qquad (7)$$

where the compensating constant $\Delta_2$ may be set to 4 in a 256-step gray scale.

Finally, in operation S90, it is determined whether to finish the digital image quality enhancing method according to this invention. That is, it is determined whether the concerned pixel is the last pixel to be subjected to image quality enhancement processing, and if it is determined that the concerned pixel is the last one, the image quality enhancement method will be finished. Otherwise, if it is determined that the concerned pixel is not the last one, the process returns to operation S20 in order to repeat image quality enhancement processing for a next concerned pixel.

Figure 6:
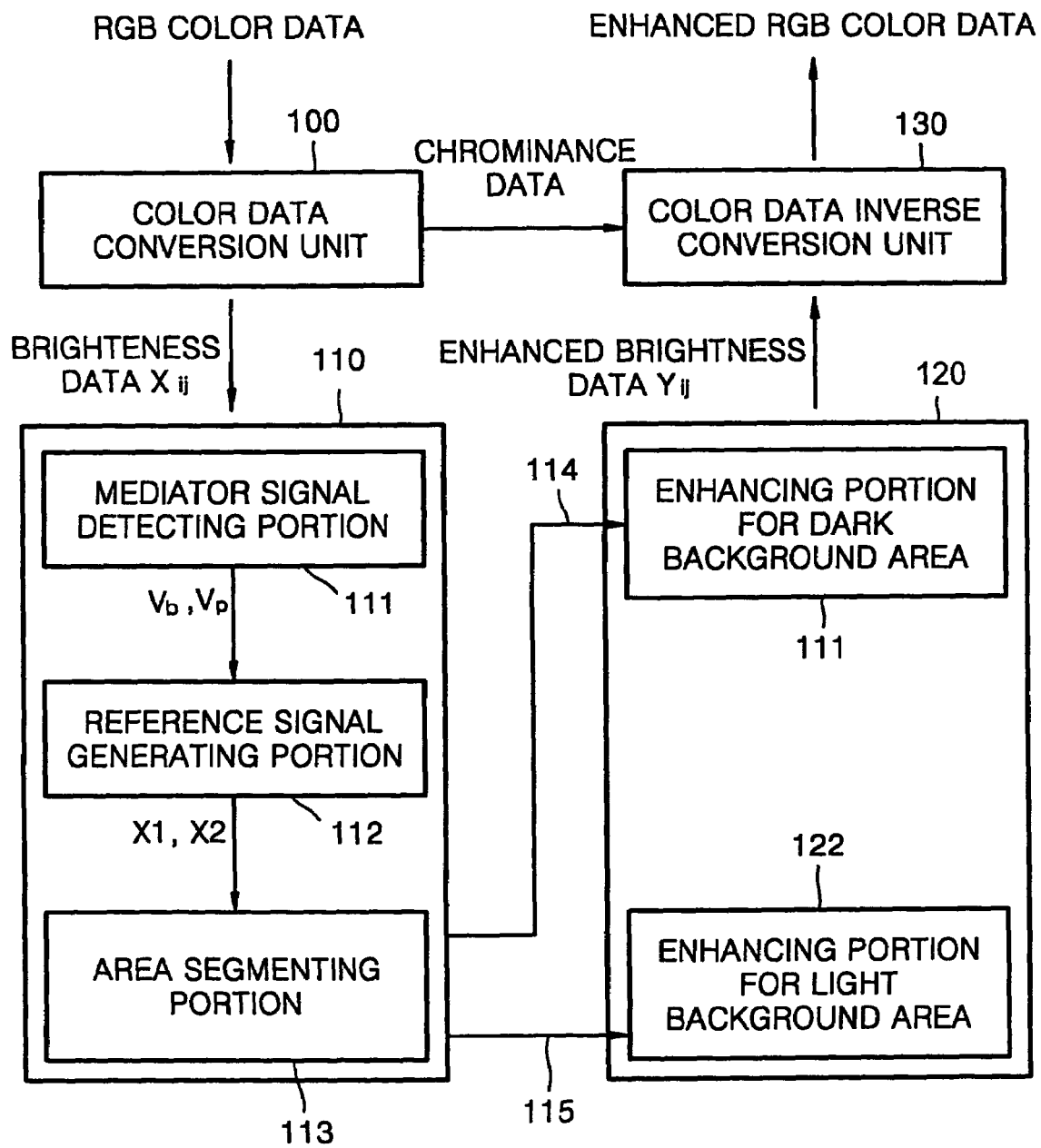
FIG. 6 is a block diagram of an apparatus for enhancing digital image quality according to an embodiment of the present invention.

FIG. 6 is a block diagram of an apparatus for enhancing digital image quality according to the present invention. Referring to FIG. 6, the apparatus comprises a color data conversion unit 100, a segmentation unit 110, an enhancement unit 120, and a color data inverse conversion unit 130.

The color data conversion unit 100 converts incoming RGB data for a concerned pixel into data containing brightness and chrominance components. For example, a YCbCr signal is extracted and output from RGB data by look-up table (LUT) of Equation (2). Here, Y corresponds to brightness signal Xij of the concerned pixel used in this invention. With regard to the image data comprised of pixels having predetermined resolutions obtained by scanning a document, the segmentation unit 110 divides the concerned pixel with externally input brightness data Xij into a background area requiring contrast enhancement and an area other than the background area not requiring such contrast enhancement. The segmentation unit 110 is subdivided to include a mediator signal detecting portion 111, a reference signal generating portion 112, and an area segmenting portion 113. The mediator signal detecting portion 111 detects a minimum value of Xij from a corresponding concerned line and outputs a mediator signal Vb while detecting a maximum value of Xij from the corresponding concerned line and outputs a mediator signal Vp. The reference signal generating portion 112 outputs a signal X1 derived by applying a weighting factor α and an offset a to Vb in response to Vb while outputting a signal X2 derived by applying a weighting factor β and an offset b to Vp in response to Vp. The area segmenting portion 113 compares Xij with either X1 or X2 and outputs a first area signal if Xij is less than or equal to X1, a second area signal if Xij is greater than X1 but less than X2, and a third area signal if Xij is greater than or equal to X2.

The enhancement unit 120 performs contrast enhancement processing on a concerned pixel belonging to the background area. The enhancement unit 120 comprises: an enhancing portion 121 for a dark background area and an enhancing portion 122 for a light background area. The enhancing portion 121 for dark background area outputs an enhanced signal Yij obtained by decreasing the magnitude of brightness signal Xij in response to the first area signal and signal X1. Here, the signal Yij is derived by dividing a predetermined value Y1 that is less than that of X1 signal by X1 and then multiplying that result by the brightness signal Xij of the concerned pixel. That is, the signal Yij is obtained by the operation shown in Equation (8):

$$Yij = \frac{Y1}{X1} Xij \qquad (8)$$

where the value of Y1 is less than that of signal X1.

The enhancing portion 122 for light background area outputs an enhanced signal Yij obtained by increasing the magnitude of brightness signal Xij in response to the third area signal and signal X2. Here, the signal Yij is obtained by the operation in Equation (9):

$$Yij = \frac{255 - Y2}{255 - X2}(Xij - X2) + Y2 \qquad (9)$$

where the value of Y2 is greater than the value of signal X2.

Color data inverse conversion unit 130 transforms the Yij signal output from the enhancement unit 120 after contrast enhancement and Cb and Cr signals output from the color data conversion unit 100 back into RGB data. Here, the Yij signal corresponds to the luminance component Y in Equation (3) for color data inverse transform. For example, brightness data may be output by creating a look-up table (LUT) which maps YCbCr data onto RGB color data.

As described above, the method and apparatus for enhancing digital image quality according to this invention are applied adaptively according to a document image having various characteristics input from an image input device of an image processing apparatus, thus enabling automatic contrast enhancement at high speed without the need for pre-processing.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A method of enhancing digital image quality wherein original brightness data Xij of a concerned pixel is compared with brightness levels X1 and X2 to obtain new brightness data Yij with enhanced contrast, the method comprising:
   setting initial values of the brightness level X1, the brightness level X2, a parameter Vb for calculating the brightness level X1 and a parameter Vp for calculating the brightness level X2;
   generating enhanced RGB color data for the concerned pixel by:
      transforming RGB color data for the concerned pixel into the brightness data Xij and chrominance data;
      comparing the brightness data Xij with the parameters Vb and Vp and resetting the parameters Vb and Vp according to results of the comparison;
      identifying whether the concerned pixel belongs to a background area requiring contrast enhancement according to results of a comparison between the brightness data Xij and at least one of parameter X1 and X2;
      performing contrast enhancement on pixels belonging to the background area requiring contrast enhancement to obtain the brightness data Yij with enhanced contrast;
      inversely transforming the enhanced contrast brightness data Yij and the transformed chrominance data into enhanced RGB color data;
      determining whether the concerned pixel is a last pixel in the concerned line;
   generating the enhanced RGB color data for a next concerned pixel in the concerned line, if the concerned pixel is not the last pixel in the concerned line;
   updating the brightness levels X1 and X2 using the parameters Vb and Vp, respectively, if the concerned pixel is the last pixel in the concerned line; and
   generating the RGB color data for a next concerned pixel in a next concerned line, if the concerned pixel is not the last pixel to be subjected to the image quality enhancement processing.

2. The method of claim 1, wherein in the transforming of the RGB color data for the concerned pixel into the brightness data Xij and the chrominance data, the scanned RGB color data is transformed into YCbCr color data comprising a Y component and chrominance data Cb and Cr, and the Y component is adopted as the brightness data Xij of the concerned pixel.

3. The method of claim 2, wherein:
   in the inversely transforming the enhanced contrast brightness data Yij and the transformed chrominance data obtained into the enhanced RGB color data, the YCbCr color data is inversely transformed into the RGB color data by substituting the enhanced contrast brightness data Yij and the chrominance data Cb and Cr, respectively, into Y, Cb, and Cr in an inverse transform equation.

4. The method of claim 1, wherein in the transforming of the RGB color data for the concerned pixel into the brightness data Xij and the chrominance data, the scanned RGB color data is transformed into YIQ color data comprised of luminance data Y and chrominance data I and Q, and the Y component is adopted as the brightness data Xij of the concerned pixel.

5. The method of claim 4, wherein in the inversely transforming of the enhanced contrast brightness data Yij into the enhanced RGB color data, the YIQ color data is inversely transformed into the RGB color data by substituting the brightness data Yij and the chrominance data I and Q, respectively, into Y, I, and Q in an inverse transform equation.

6. The method of claim 1, wherein the comparing of the brightness data Xij with the parameters Vb and Vp and the resetting of the parameters Vb and Vp comprises:
determining whether the brightness data Xij of the concerned pixel is less than the parameter Vb;
subtracting a predetermined constant $\Delta_1$ from the parameter Vb and resetting a value of Vb, upon determining that the brightness data Xij of the concerned pixel is less than the parameter Vb;
determining whether the brightness data Xij of the concerned pixel is greater than the parameter Vp; and
adding the predetermined constant $\Delta_1$ to the parameter Vp and resetting a value of Vp, upon determining that the brightness data Xij of the concerned pixel is greater than the parameter Vp.

7. The method of claim 1, wherein the identifying of whether the concerned pixel belongs to the background area requiring contrast enhancement and the performing of contrast enhancement on pixels belonging to the background area requiring contrast enhancement comprises:
determining whether the brightness data Xij is less than or equal to the brightness level X1;
performing contrast enhancement for dark background area on the brightness data Xij and obtaining the brightness data Yij with enhanced contrast, upon determining that the brightness data Xij is less than or equal to the brightness level X1;
determining whether the brightness data Xij is greater than or equal to the brightness level X2, upon determining that the brightness data Xij is greater than the brightness level X1; and
performing contrast enhancement for light background area on the brightness data Xij and obtaining the brightness data Yij with enhanced contrast, upon determining that the brightness data Xij is greater than or equal to the brightness level X2.

8. The method of claim 7, wherein the obtaining the brightness data Yij with enhanced contrast for the dark background area comprises:
dividing Y1 which is less than the brightness level X1 by the brightness level X1 and obtaining a contrast enhancing coefficient t1 for a dark background area; and
multiplying the contrast enhancing coefficient t1 by the brightness data Xij and obtaining the brightness data Yij.

9. The method of claim 7, wherein the obtaining the brightness data Yij with enhanced contrast for the light background area comprises:
subtracting a predetermined value Y2 which is greater than the brightness level X2 from a maximum brightness value which is pure white and obtaining a first subtraction value;
subtracting the brightness level X2 from the maximum brightness value which is pure white and obtaining a second subtraction value;
dividing the first subtraction value by the second subtraction value and obtaining a contrast enhancing coefficient t2 for light background area;
subtracting the brightness level X2 from the brightness data Xij;
multiplying the contrast enhancing coefficient t2 by a result of subtracting the brightness level X2 from the brightness data Xij; and
adding the predetermined value Y2 to a result of multiplying t2 by the result of subtracting the brightness level X2 from the brightness data Xij, to obtain the brightness data Yij.

10. The method of claim 1, wherein the updating of the brightness levels X1 and X2 using the parameters Vb and Vp, respectively, comprises:
updating the brightness level X1 with a value derived by multiplying a predetermined weighting factor $\alpha$ by the parameter Vb and then adding a predetermined offset a to the product $\alpha Vb$; and
updating the brightness level X2 with a value derived by multiplying a predetermined weighting factor $\beta$ by the parameter Vp and then adding a predetermined offset b to the product $\beta Vp$.

11. The method of claim 10, wherein the weighting factor $\alpha$ is determined to be in a range where $0<\alpha\leq 1$.

12. The method of claim 10, wherein the offset a is determined to be in a range where $-128\leq a\leq 127$.

13. The method of claim 10, wherein the weighting factor $\beta$ is determined to be in a range where $0<\beta\leq 1$.

14. The method of claim 10, wherein the offset b is determined to be in a range where $-128\leq b\leq 127$.

15. The method of claim 1, further comprising compensating the parameters Vb and Vp after updating the brightness levels X1 and X2 before generating of the RGB color data for a next concerned pixel in a next concerned line.

16. The method of claim 15, wherein the compensating of the parameters Vb and Vp comprises:
updating Vb and Vp by compensating for the parameters Vb and Vp after adding and subtracting a predetermined constant $\Delta_2$ to and from the parameters Vb and Vp, respectively; and
if Vb compensated for by adding Vb and $\Delta_2$ is greater than the initially set value of Vb, updating Vb with the initial value of Vb, and if Vp compensated for by subtracting $\Delta_2$ and Vp is less than the initially set value of Vp, updating Vp with the initial value of Vp.

17. A digital image quality enhancing apparatus for performing image enhancement processing on image data comprising pixels having predetermined resolutions obtained by scanning a document, the apparatus having a color data conversion unit for converting incoming RGB data for a concerned pixel into brightness data Xij and chrominance data, a division unit for dividing the concerned pixel into a background area requiring contrast enhancement and an area other than the background area not requiring the contrast enhancement using the brightness data Xij, an enhancement unit for performing the contrast enhancement on the concerned pixel belonging to the background area, and a color data inverse conversion unit for inversely converting a Yij signal output from the enhancement unit after contrast enhancement and the chrominance data output from the color data conversion unit back into the RGB data, wherein the division unit comprises:

a mediator signal detecting portion which detects a minimum value of the brightness data Xij from a corresponding concerned line and outputs a mediator signal Vb while detecting a maximum value of the brightness data Xij from the corresponding concerned line and outputting a mediator signal Vp;

a reference signal generating portion which outputs a signal X1 derived by applying a predetermined weighting factor α and a predetermined offset a to the mediator signal Vb in response to the mediator signal Vb while outputting a signal X2 derived by applying a predetermined weighting factor β and a predetermined offset b to the mediator signal Vp in response to the mediator signal Vp; and an area segmenting portion that compares the brightness data Xij with the signals X1 and X2 and outputs a first area signal if Xij is less than or equal to the signal X1, a second area signal if Xij is greater than the signal X1 but less than the signal X2, and a third area signal if Xij is greater than or equal to the signal X2.

18. The apparatus of claim 17, wherein the enhancement unit comprises:

an enhancing portion for dark background area that outputs the enhanced signal Yij obtained by decreasing the magnitude of brightness data Xij in response to the first area signal and the signal X1; and an enhancing portion for light background area that outputs the enhanced signal Yij obtained by increasing the magnitude of brightness data Xij in response to the third area signal and the signal X2.

19. The apparatus of claim 18, wherein the enhancing portion for dark background area outputs the signal Yij, which is brightness data with enhanced contrast, obtained by the following Equation:

$$Yij = \frac{Y1}{X1} Xij$$

where a value of Y1 is less than a value of the signal X1.

20. The apparatus of claim 18, wherein the enhancing portion for light background area outputs the signal Yij, which is brightness data with enhanced contrast, obtained by the following Equation:

$$Yij = \frac{255 - Y2}{255 - X2}(Xij - X2) + Y2$$

where a value of Y2 is greater than a value of the signal X2.

21. The apparatus of claim 17, wherein the color data conversion unit comprises a look-up table (LUT) that stores the brightness data and chrominance data corresponding to the RGB data.

22. The apparatus of claim 17, wherein the color data inverse conversion unit comprises a look-up table (LUT) that stores the RGB data corresponding to the brightness data and chrominance data.

23. A method of enhancing digital image quality, comprising:

converting input color data for a concerned pixel into an input brightness component and input chrominance component;

comparing a value of the input brightness component with first and second predetermined values, the second predetermined value being greater than the first predetermined value;

outputting a brightness component having one of a lower value, a higher value, and the input value, in response to the comparison, wherein the outputting of the brightness component comprises:

outputting the brightness component having the lower value in response to the comparison determining that the input brightness component in less than or equal to the first predetermined value, outputting the brightness component having the higher value in response to the comparison determining that the input brightness component is greater than or equal to the second predetermined value, and outputting the brightness component having the input value in response to the comparison determining that the input brightness component is neither less than or equal to the first predetermined value nor greater than or equal to the second predetermined value;

re-converting the input chrominance component and the output brightness component to provide contrast enhanced color data for the concerned pixel;

repeating the converting, the comparing, the outputting and the re-converting for each pixel in each concerned line; and updating the first and second predetermined values between concerned lines.

24. The method of claim 23, wherein the updating of the first and second predetermined values comprises:

establishing initial values of first and second variables;

comparing respective values of the first and second variables with the value of the input brightness component for each concerned pixel in the concerned line; and decreasing the value of the first variable by a first differential if the input brightness component of a current concerned pixel is less than a present value of the first variable;

increasing the value of the second variable by the first differential if the input brightness component of the current concerned pixel is greater than the a present value of the second variable;

computing a new value for the first predetermined value by multiplying the present value of the first variable after a last pixel in the concerned line by a first predetermined weighting factor and adding a first predetermined offset value; and computing a new value for the second predetermined value by multiplying the present value of the second variable after a last pixel in the concerned line by a second predetermined weighting factor and adding a second predetermined offset value.

25. The method of claim 24, further comprising:

establishing a new value of the first variable as a minimum of:

the initial value of the first variable, and a sum of the present value of the first variable after the last pixel in the concerned line and a second differential; and establishing a new value of the second variable as a maximum of:

the initial value of the second variable, and a difference between the present value of the second variable after the last pixel in the concerned line and the second differential.

26. The method of claim 23, wherein the input color data and the enhanced color data are RGB color data.

27. The method of claim 23, wherein the input brightness component and the output brightness component are Y components of YCbCr color data.

28. The method of claim 23, wherein the input brightness component and the output brightness component are Y components of YIQ color data.

* * * * *

UNITED STATES PATENT AND TRADEMARK OFFICE
CERTIFICATE OF CORRECTION

PATENT NO. : 7,170,645 B2 Page 1 of 1
APPLICATION NO. : 10/653452
DATED : January 30, 2007
INVENTOR(S) : Kyeong-man Kim et al.

It is certified that error appears in the above-identified patent and that said Letters Patent is hereby corrected as shown below:

Column 11, Line 36, change "X 1;" to --X1;--.

Column 14, Line 43, after "the" delete "a".

Signed and Sealed this

Twenty-fourth Day of April, 2007

JON W. DUDAS
*Director of the United States Patent and Trademark Office*